No. 630,800. Patented Aug. 8, 1899.
T. O. TERHUNE.
ENDLESS CONVEYER.
(Application filed July 25, 1895.)

(No Model.)

Witnesses.
Fred L. Grumbaf.
Edward F. Allen.

Inventor.
Theodore O. Terhune.
by Crosby Gregory.
attys.

THE NORRIS PETERS CO., PHOTO-LITHO., WASHINGTON, D. C.

UNITED STATES PATENT OFFICE.

THEODORE O. TERHUNE, OF BOSTON, MASSACHUSETTS, ASSIGNOR TO THE STEEL CABLE ENGINEERING COMPANY, OF SAME PLACE.

ENDLESS CONVEYER.

SPECIFICATION forming part of Letters Patent No. 630,800, dated August 8, 1899.

Application filed July 25, 1895. Serial No. 557,078. (No model.)

*To all whom it may concern:*

Be it known that I, THEODORE O. TERHUNE, of Boston, county of Suffolk, State of Massachusetts, have invented an Improvement in Endless Conveyers, of which the following description, in connection with the accompanying drawings, is a specification, like letters on the drawings representing like parts.

In the handling of coal, ore, and other material in bulk to transfer it from one point to another endless conveyers are very largely employed, such conveyers consisting, substantially, of a series of buckets or carriers attached to endless cables or chains which are passed around suitable power and guide wheels. Means are provided at one point for loading the buckets or carriers, and at the point of discharge the contents of the carriers are deposited by suitable devices varying in character according to the construction of the buckets and surrounding conditions. To operate such conveyer systems economically, it is most desirable that the loading be accomplished while the train of buckets is in continuous motion in a horizontal or slightly-inclined plane, and means must be provided to prevent the passage of more or less of the material between adjacent buckets.

This invention relates more particularly to the production of means for preventing such escape of the material as it is being loaded into the buckets as they pass beneath a chute or loading-trough, and I have so constructed the buckets that the intervening space between adjacent buckets will be bridged over or covered during the loading and while the buckets are moving in a horizontal or slightly-inclined path.

Figure 1:
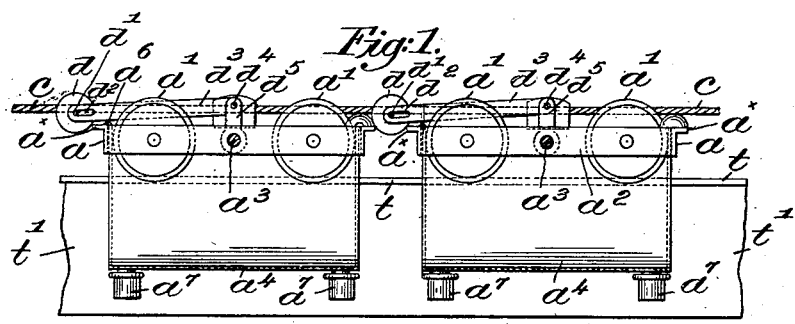
Figure 2:
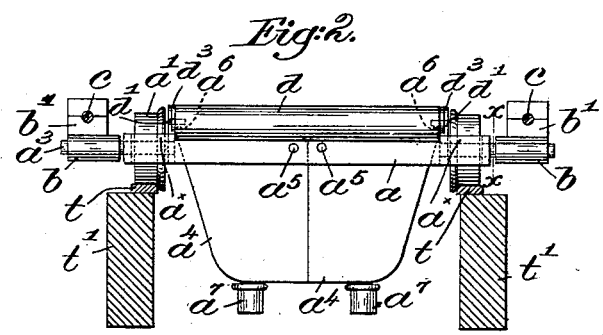
Figures 3, 4:
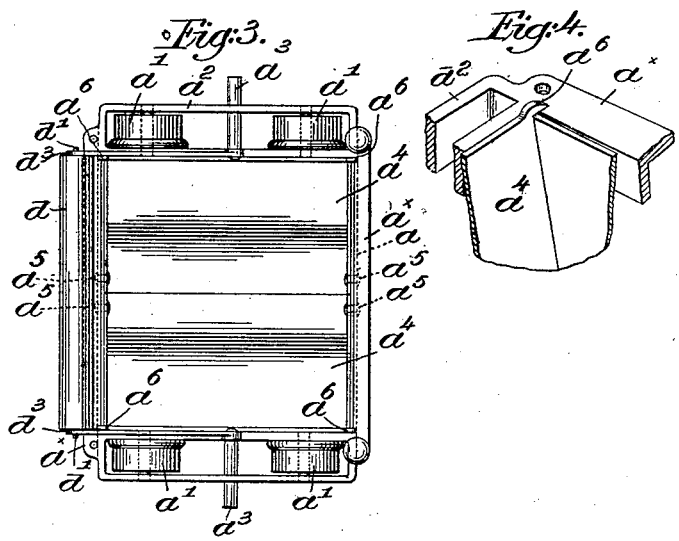

Figure 1, in side elevation, represents as ufficient portion of an endless conveyer to be understood, taken on the line $x$ $x$, Fig. 2, two buckets or carriers being shown with my invention applied thereto. Fig. 2 is an end view of one of the buckets. Fig. 3 is a top or plan view thereof, and Fig. 4 is an enlarged detail perspective view of a portion of one of the bucket-frames with the engaging lip of the bucket-jaw.

I have herein shown my invention as applied to that class of buckets formed of two parts or halves which are swung apart to discharge the contents.

Referring to the drawings, a series of metal frames $a$ are provided at their sides with flanged wheels or rolls $a'$ to run upon tracks $t$, secured to timbers or other supports $t'$, the wheels being shown as mounted within guards $a^2$. At each side of the frame and preferably at the center short shafts or studs $a^3$ project to receive thereon hubs $b$, secured to or forming clamps or flights $b'$, which are attached to the endless cables $c$, one at each side of the frame. These flights enter or are engaged by suitable driving-wheels (not shown) of well-known construction, to impart motion to the conveyer.

The jaws or halves $a^4$ of the bucket are pivoted at their upper inner corners at $a^5$ to the ends of the frame and within the same, the jaws being separated in the direction of the length of the conveyer. Lips or projections $a^6$ at the outer corners of the jaws normally rest on the top of the frame (see Fig. 4) and prevent improper inward movement of the jaws. On the exterior of the jaws and preferably on the bottom thereof one or more suitable projections or rolls $a^7$ are adapted to be engaged by the tripping devices to turn the jaws on their pivots $a^5$ and separate them to thereby discharge the contents at the proper time.

At each end the frame $a$ is bent or overturned to form an outwardly-projecting flange $a^\times$, on which normally rests by gravity a guard-roll $d$, its journals $d'$ projecting into slots $d^2$ in arms $d^3$, pivoted at $d^4$ to standards $d^5$ on the sides of the frames $a$, preferably at the center thereof.

Under normal conditions the buckets travel in a horizontal or slightly-inclined path, and, as shown in Fig. 1, the flanges $a^\times$ on the frames of adjacent buckets project toward each other, the guard $d$ on one of the buckets resting on the adjacent flanges and covering the space between the buckets or carriers.

When passing the loading-point, the material will be discharged into the buckets, and as they pass along the space between them is covered by the guards $d$, and any material falling on them will be directed by their convex surfaces into the adjacent buckets. Thus little or no material will escape from the buckets as they are loaded.

As the buckets pass around the guide or driving wheels, moving in the direction of the arrow 20, Fig. 1, each bucket as it begins to rise will by its rearmost flange $a^\times$ lift the roll $d$ of the bucket next behind it, and when the leading bucket is raised far enough its flange will slip by the roll and it will drop into the position shown on the leading bucket, Fig. 1.

While the buckets pass around the wheels, they will be suspended from the hubs $b$ of the flights $b'$ until they reach the upper run or track, and then the roll $d$, which will then be at the rear end of each bucket, will rest on the flange of the next following bucket. The slots $d^2$ in the arms $d^3$ permit the necessary movement of the rolls, and the arms rise and fall as required.

Of course if the buckets pass from a higher to a lower run the leading bucket sinks from beneath the roll $d$ of the next following bucket.

If desired, I can counterbalance the weight of the guard-roll $d$ at one end of the bucket by attaching counterpoise-weights $w$ at the other end, as shown in Figs. 1 and 3.

As the arms $d^3$ are preferably pivoted at the center of the bucket, I can use the guard-roll at either end, according to the direction of movement and the manner in which the buckets pass from one run to the other.

The guard-rolls do not interfere in the least with the relative vertical movements of adjacent buckets when passing around the power or guide wheels and add but little to the weight, while a sub unbroken loading-surface is presented with no gaps between buckets into which the material could escape during loading. A continuous stream of material may thus be delivered at the loading-point, the convex surfaces of the guard-rolls distributing what material falls thereupon.

I do not herein claim, broadly, a guard or overlapping device movably mounted upon the bucket or its frame, as the same is claimed, broadly, in an application filed by Edwin S. Decker, Serial No. 557,068, but restrict myself herein to a guard or overlapping device mounted to swing about a fulcrum upon the bucket, its frame, or some part of the conveyer and having also a movement toward and from said fulcrum and also to a guard or overlapping device movably mounted in one or more supporting carriers or members, which latter are themselves movably mounted upon the said bucket, its frame, or some part of the conveyer, together with such details and embodiments thereof as are fully shown, described, and claimed herein.

I claim—

1. In a conveyer, the combination with a bucket, of a guard, and a support therefor adapted to swing relatively to said bucket, said guard being also movable toward and from the fulcrum of said support, substantially as described.

2. In a conveyer, a bucket-frame, a bucket therein, and a convex-surfaced guard movably mounted on a swinging support on said frame to overlap one end thereof and cover the space between it and the end of the adjacent frame, substantially as described.

3. In a conveyer, a series of connected frames, supporting wheels or rolls on the frames, a bucket attached to each frame, and a guard rotatably mounted in arms jointed at the center of the frame, and movable toward and from the fulcra of said arms to overlap one end of its frame and cover the space between it and the frame of the adjacent bucket, substantially as described.

4. A bucket or carrier for endless conveyers, comprising a frame, supporting-wheels therefor, a bucket suspended in the frame, and a guard-roll pivotally connected to a swinging support on the frame and adapted to normally project beyond one end of the frame, substantially as described.

5. In an endless conveyer, a series of pivotally-suspended buckets, connections between the buckets, each bucket having at one end a guard-roll pivotally mounted in a swinging support, to overlap the space between adjacent buckets, substantially as described.

6. In a conveyer, an endless cable, a series of frames suspended therefrom, a two-part separable bucket pivotally mounted in each frame, a projecting flange at the ends of the frames, and a guard-roll for each bucket, mounted in a swinging support, and adapted to normally rest on the end flanges of adjacent frames and cover the space between them, substantially as described.

7. In a conveyer, the combination with a bucket, of a guard, a support adapted to swing relatively to and movable with said bucket and in which said guard is rotatably mounted, substantially as described.

8. In a conveyer, the combination with a bucket, of a support swingingly mounted on the bucket, a guard rotatably mounted in said support, and a slot in the latter to permit movement of said guard toward and from the fulcrum of said support, substantially as described.

9. In a conveyer, the combination with a bucket, of a guard, to swing about a fulcrum on said bucket or its frame, said guard being also movable toward and from its said fulcrum, substantially as described.

10. In a conveyer, the combination with a bucket, of a support movably mounted thereupon, and a guard movably mounted in the said movable support or supports, substantially as described.

In testimony whereof I have signed my name to this specification in the presence of two subscribing witnesses.

THEODORE O. TERHUNE.

Witnesses:
FREDERICK L. EMERY,
EDWIN S. DECKER.